(12) United States Patent
Tsai

(10) Patent No.: US 7,710,666 B2
(45) Date of Patent: May 4, 2010

(54) IMAGING LENS MODULE

(75) Inventor: Fei-Hsin Tsai, Wai Pu Hsiang (TW)

(73) Assignee: Newmax Technology Co., Ltd., Taichung County (TW)

( * ) Notice: Subject to any disclaimer, the term of this patent is extended or adjusted under 35 U.S.C. 154(b) by 0 days.

(21) Appl. No.: 12/181,270

(22) Filed: Jul. 28, 2008

(65) Prior Publication Data
US 2010/0020416 A1    Jan. 28, 2010

(51) Int. Cl.
G02B 9/34     (2006.01)
G02B 13/22    (2006.01)

(52) U.S. Cl. .................. 359/772; 359/715; 359/771
(58) Field of Classification Search .......... 359/715, 359/771, 772, 773, 774
See application file for complete search history.

(56) References Cited

U.S. PATENT DOCUMENTS

| 6,744,570 | B1 * | 6/2004 | Isono | 359/772 |
| 7,453,654 | B2 * | 11/2008 | Shinohara | 359/773 |
| 2009/0168201 | A1 * | 7/2009 | Lai | 359/708 |
| 2009/0185292 | A1 * | 7/2009 | Tsai | 359/771 |

* cited by examiner

Primary Examiner—David N Spector
(74) Attorney, Agent, or Firm—Banger Shia

(57) ABSTRACT

An imaging lens module includes a fixed aperture stop and an optical module, and the optical module includes a first, a second, a third and a fourth lenses. The first lens has a meniscus lens with positive refractive power and a concave surface disposed towards the image. The second lens has a meniscus lens with negative refractive power and a concave surface disposed towards the image. The third lens has a meniscus lens with positive refractive power and a convex surface disposed towards the image. The fourth lens has a concave surface disposed towards the object.

6 Claims, 6 Drawing Sheets

Focal length : f = 3.679 mm
(F NO.) : F 2.8
Viewing angle : 2ω = 63°

| Surf | Radius | Thickness | nd | vd |
|---|---|---|---|---|
| OBJ | Infinity | Infinity | | |
| 1 | 1.214989 | 0.7282912 | 1.531000 | 56.000000 |
| 2 | 9.671058 | 0.06302577 | | |
| STO | Infinity | 0.01007102 | | |
| 4 | 23.58273 | 0.3980628 | 1.632000 | 23.000000 |
| 5 | 2.337006 | 0.4520784 | | |
| 6 | -1.855134 | 0.7966752 | 1.514000 | 57.000000 |
| 7 | -0.7706911 | 0.2783441 | | |
| 8 | -2.226348 | 0.4923241 | 1.514000 | 57.000000 |
| 9 | 2.527282 | 0.1085623 | | |
| 10 | Infinity | 0.3 | 1.516798 | 64.198266 |
| 11 | Infinity | 0.428523 | | |
| 12 | Infinity | 0.4 | 1.516798 | 64.198266 |
| 13 | Infinity | 0.045 | | |
| IMA | Infinity | | | |

SURFACE DATA DETAIL:

Surface 1
K : 0.5436
A : 0.18465
B : 0.1456786
C : 0.17536787
D : 0.033596054
E : -0.00072418168

Surface 2
K : 250.456
A : 0.26709546
B : -0.38960824
C : -0.7567893
D : 0.3486
E : -6.2041522

Surface 4
K : 453.45
A : 0.56789
B : -0.7568
C : 0.1456
D : -0.15063095
E : -3.6194124

Surface 5
K : -7.052343
A : 0.23956876
B : -0.2576789
C : -0.1236786
D : -0.024414804
E : 0.64952022

Surface 6
K : 1.857558
A : -0.1786
B : 0.3456789
C : -0.15678
D : -0.070171515
E : 0.052505306

Surface 7
K : -0.7927784
A : 0.14388855
B : -0.12851503
C : 0.057678
D : 0.022445988
E : -0.0024038447

Surface 8
K : -3.938821
A : -0.0245678
B : 0.029533195
C : -0.0067432017
D : 0.00073352523
E : -4.3287069e-005

Surface 9
K : -28.54637
A : -0.08283754
B : 0.018516096
C : -0.00566095
D : 0.00083198804
E : -2.1572381e-005

$$\frac{|f_1|}{|f|} = 0.69 \qquad \frac{|f_2|}{|f_3|} = 2$$

$$\frac{|f_{234}|}{|f|} = 1.575$$

FIG.5

Focal length : f = 4.027 mm
(F NO.) : F 2.8
Viewing angle : 2ω = 58.3°

| Surf | Radius | Thickness | nd | vd |
|---|---|---|---|---|
| OBJ | Infinity | Infinity | | |
| 1 | 1.187148 | 0.5554309 | 1.531000 | 56.000000 |
| 2 | 8.780119 | 0.075 | | |
| STO | Infinity | 0.02 | | |
| 4 | 69.5525 | 0.4 | 1.632000 | 23.000000 |
| 5 | 3.310763 | 0.7367137 | | |
| 6 | -1.341116 | 0.6533058 | 1.514000 | 57.000000 |
| 7 | -0.8616481 | 0.2565202 | | |
| 8 | -5.886501 | 0.4799888 | 1.514000 | 57.000000 |
| 9 | 1.838625 | 0.3 | | |
| 10 | Infinity | 0.3 | 1.516798 | 64.198266 |
| 11 | Infinity | 0.2880406 | | |
| 12 | Infinity | 0.4 | 1.516798 | 64.198266 |
| 13 | Infinity | 0.045 | | |

SURFACE DATA DETAIL:

Surface 1
K : 0.1852234
A : 0.075678
B : 0.033347
C : -0.041952664
D : 0.34567

Surface 2
K : -185.45
A : 0.074911974
B : -0.19150553
C : 0.59812017
D : -0.89328979

Surface 4
K : 254.475
A : 0.018908576
B : -0.28137571
C : 0.72669574
D : -1.2466201

Surface 5
K : -25.99044
A : 0.1697536
B : -0.10536557
C : 0.11421853
D : 0.080312901

Surface 6
K : 0.94194
A : -0.11756675
B : 0.059857172
C : -0.094771075
D : 0.032185162

Surface 7
K : -1.78678
A : 0.13006029
B : -0.099826309
C : 0.078689
D : 0.045678

Surface 8
K : 10.73
A : -0.035358594
B : 0.03022372
C : -0.00866531
D : 0.00113014

Surface 9
K : -15.05992
A : -0.078119289
B : 0.015141764
C : -0.0036937258

$$\frac{|f_1|}{|f|} = 0.62 \quad \frac{|f_2|}{|f_3|} = 1.71$$

$$\frac{|f_{234}|}{|f|} = 0.931$$

FIG.10

IMAGING LENS MODULE

FIELD OF INVENTION

The present invention relates to optical lenses and, more particularly, to a four-piece imaging lens module for use in a small imaging apparatus.

BACKGROUND OF INVENTION

Simply designed, easy-to-use and highly compatible electronic devices will be the main stream in the future. To increase the compatibility, digital carriers are connected to optical lenses so that the digital carriers image objects and instantly show the images of the objects. 3-C products such as cell phones, Webcams and laptop computers are equipped with optical lenses. As the electronic devices are getting lighter and smaller, the optical lenses must also be getting lighter and smaller so that the optical lenses can be used in the digital carriers. The pixel number and the image quality are also important factors taken into consideration by a customer. A cell phone equipped with a camera providing two million pixels is not satisfactory.

There is a conventional four-piece imaging lens module including four lenses. The fourth lens includes at least one convex surface near the optical axis on the side of an object. A digital carrier equipped with the four-piece imaging lens module provides more than two million pixels, but fails to provide good image quality, high color saturation and small optical length because of the convex surface of the fourth lens.

Moreover, the fourth lens includes a convex surface on the side of an object so that the optical length cannot be reduced effectively and that the fabrication is difficult. Therefore, it is not competitive in the market. The yield of the four-piece imaging lens module is lower than expected.

The present invention is therefore intended to obviate or at least alleviate the problems encountered in prior art.

SUMMARY OF INVENTION

According to the present invention, an imaging lens module includes a first lens, a second lens, a third lens and a fourth lens sequentially between an object and an image. The first lens has a meniscus lens with positive refractive power, a concave surface disposed towards the image and at least one aspheric surface. The second lens has a meniscus lens with negative refractive power, a concave surface disposed towards the image and at least one aspheric surface. The third lens has a meniscus lens with positive refractive power, a convex surface disposed towards the image and at least one aspheric surface. The fourth lens has a concave surface disposed towards the object and at least one aspheric surface. A fixed aperture stop is provided between the first and second lenses.

An advantage of the present invention over the prior art is to include the aspheric surfaces instead of the conventional spherical surfaces so that the number of the lenses and the aberration are both reduced. Hence, the plastic imaging lens module is thin, small, light and inexpensive in fabrication and maintenance compared with the conventional glass imaging lens module.

Another advantage of the present invention is that the surface of the first lens on the side of the image is aspheric concave surface while the surface of the fourth lens on the side of the object is aspheric concave surface so that the system error sensitivity is low while the yield is high compared with the prior art. The arrangement of the lenses renders the optical length short to provide enough room for the imaging lens module.

Another advantage of the present invention is that the contrast of the imaging system and the yield are improved because of the aspheric surfaces. Therefore, to improve the performance, the lenses are made of the plastics. Moreover, software is used to design the aspheric surfaces so that the freedom in the design of the system is increased and that the entire optical system is optimized to meet the optical specifications. Hence, the yield is high and the image quality is good.

Other advantages and features of the present invention will become apparent from the following description referring to the attached drawings.

BRIEF DESCRIPTION OF DRAWINGS

The present invention will be described via the detailed illustration of two embodiments referring to the drawings.

FIG. 5 shows the optical characteristics and aspheric coefficients of the imaging lens module shown in FIG. 1.

FIG. 10 shows the optical characteristics and aspheric coefficients of the imaging lens module shown in FIG. 6.

DETAILED DESCRIPTION OF EMBODIMENTS

Figure 1:
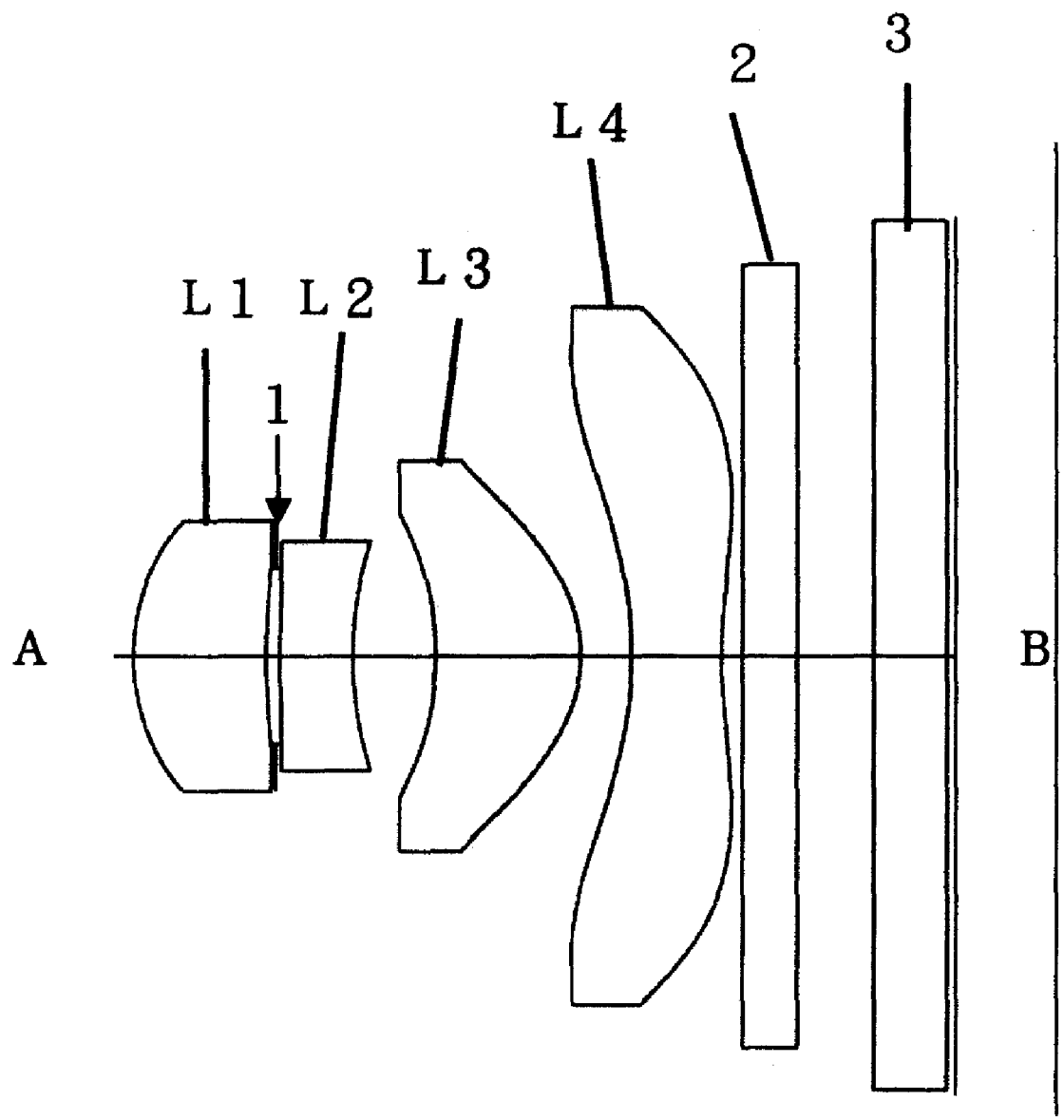
FIG. 1 is a side view of an imaging lens module according to the first embodiment of the present invention.

Referring to FIG. 1, there is shown an imaging lens module according to a first embodiment of the present invention. From an object indicated with the term "A" to an image indicated with the term "B", the imaging lens module includes a first lens L1, a second lens L2, a third lens L3 and a fourth lens L4 sequentially.

The first lens L1 has a meniscus lens with positive refractive power and a concave surface disposed towards the image B. The first lens L1 includes at least one aspheric surface.

The second lens L2 has a meniscus lens with negative refractive power and a concave surface disposed towards the image B. The second lens L2 includes at least one aspheric surface.

The third lens L3 has a meniscus lens with positive refractive power and a convex surface disposed towards the image B. The third lens L3 includes at least one aspheric surface.

The fourth lens L4 has a concave surface disposed towards the object A. The fourth lens L4 includes at least one aspheric surface.

A fixed aperture stop 1 is sandwiched between the first lens L1 and the second lens L2. There is a first flat glass panel 2 closer to the image B than the fourth lens L4 is. The first flat glass panel 2 is used to filter infrared light. There is a second flat glass panel 3 closer to the image B than the first flat glass panel 2 is. The second flat glass panel 3 is used to protect a photo sensor located on the image B. The amount of flat glass panels such as the first flat glass panel 2 and the second flat glass panel 3 can be increased or reduced to improve the image quality based on different package structures of photo sensors. The photo sensor may be a CCD or CMOS.

As an advantageous feature of the imaging lens module, the lenses are made of plastics, thus reducing the cost in the use and management of the material. The plastics render it easy to make the aspheric surfaces. The aspheric surfaces improve the solution but reduce the amount of the lenses required to form the image. Hence, the imaging lens module provides good image quality.

Figure 2:
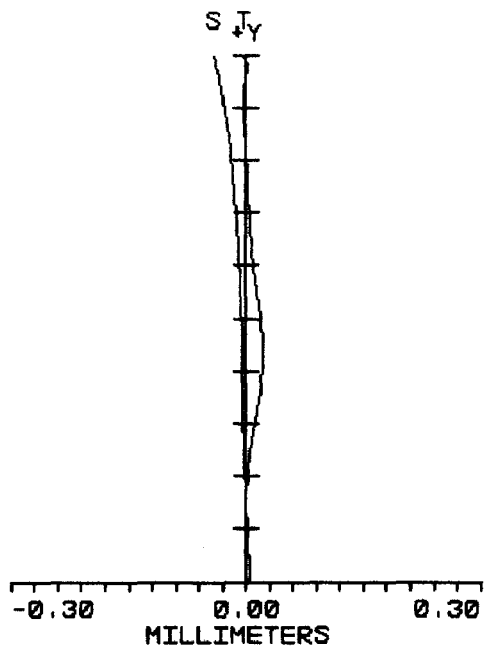
FIG. 2 is a chart of the non-dotted aberration of the imaging lens module shown in FIG. 1.
Figure 3:
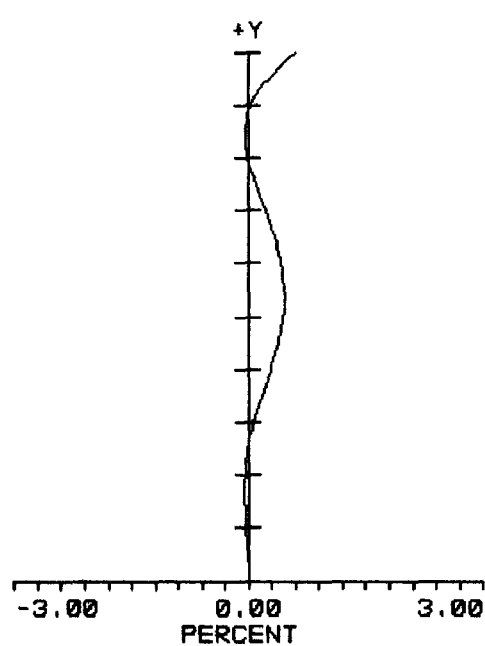
FIG. 3 is a chart of the distortion aberration of the imaging lens module shown in FIG. 1.
Figure 4:
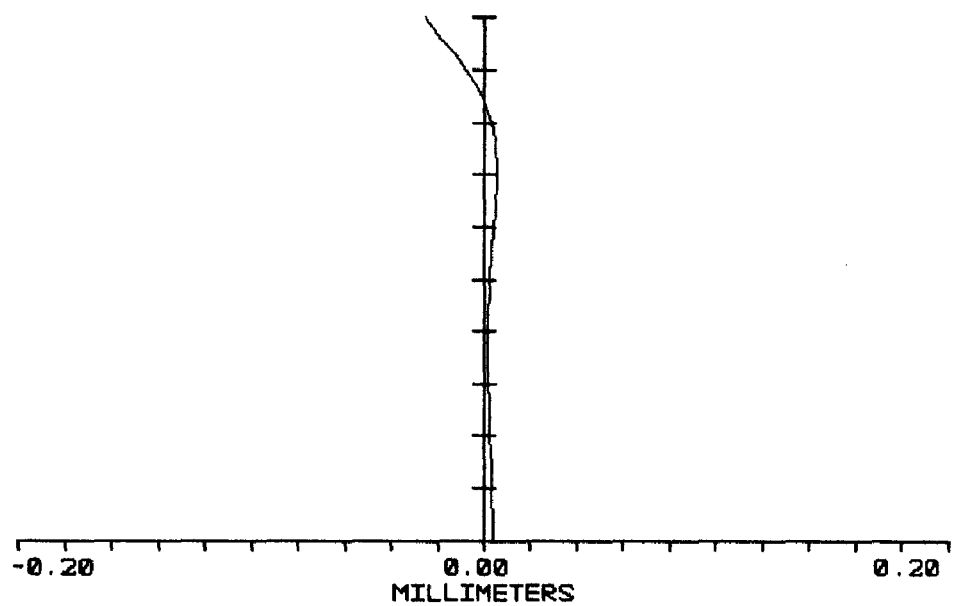
FIG. 4 is a chart of the spherical aberration of the imaging lens module shown in FIG. 1.
Figure 6:
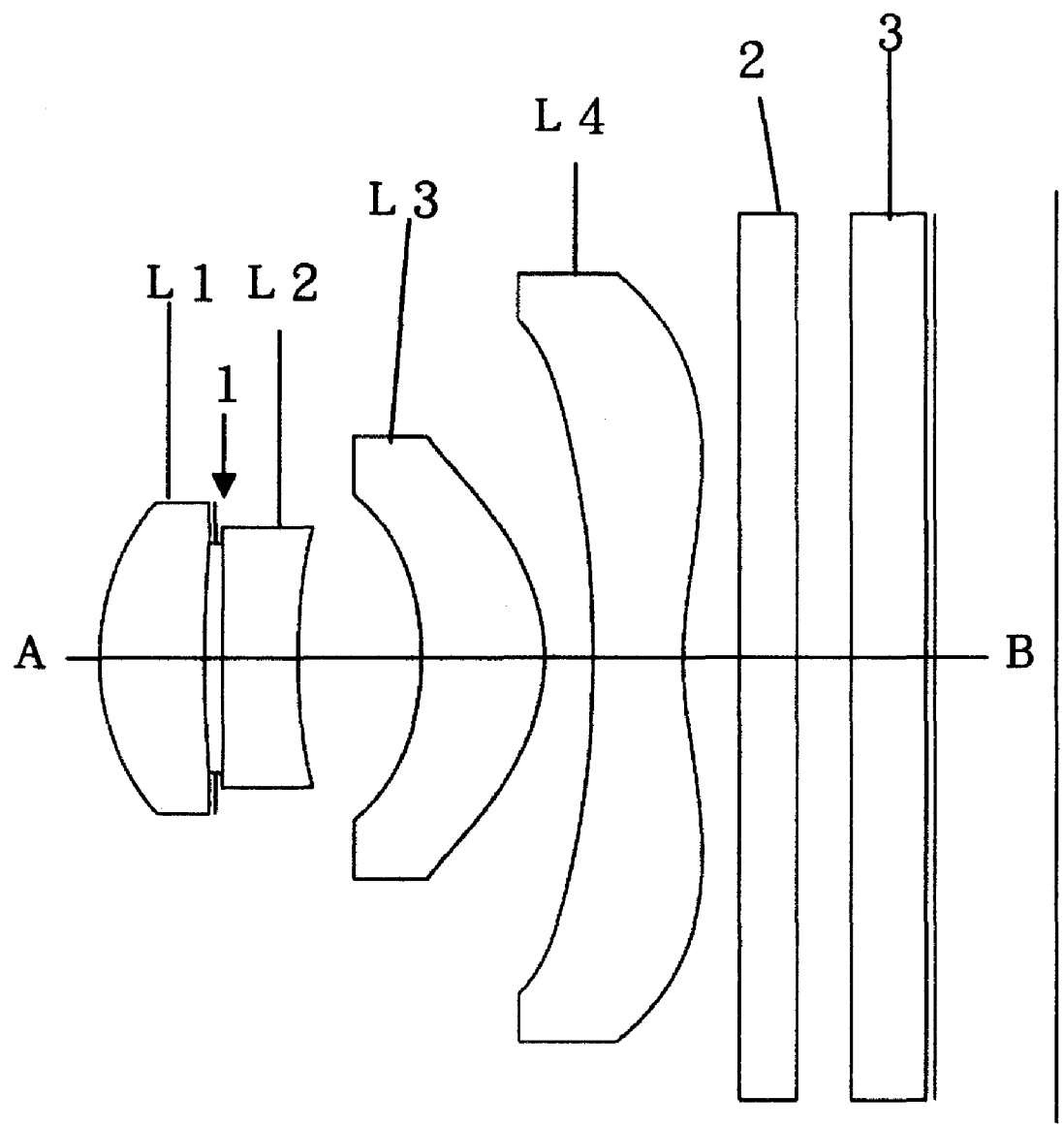
FIG. 6 is a side view of an imaging lens module according to the second embodiment of the present invention.
Figure 7:
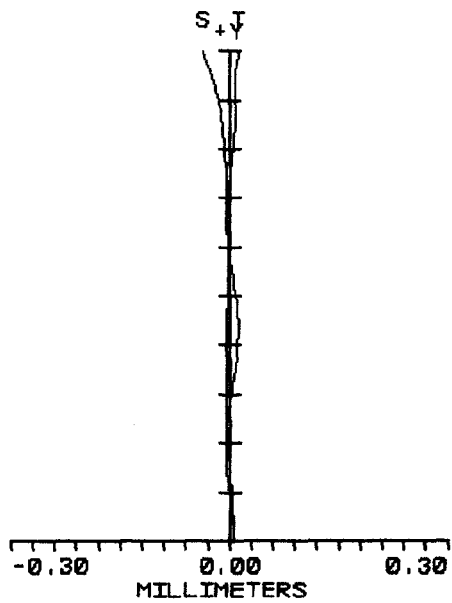
FIG. 7 is a chart of the non-dotted aberration of the imaging lens module shown in FIG. 6.
Figure 8:
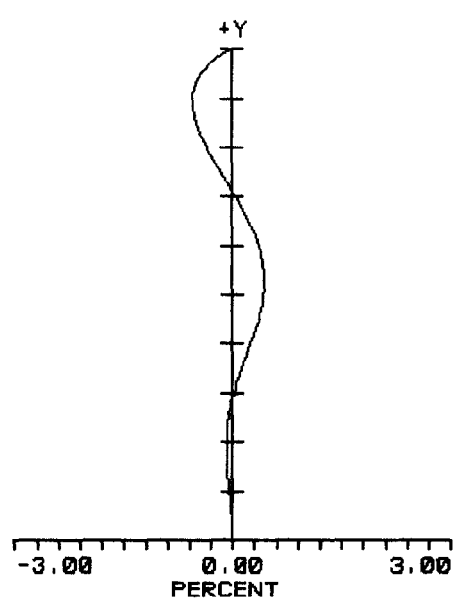
FIG. 8 is a chart of the distortion aberration of the imaging lens module shown in FIG. 6.
Figure 9:
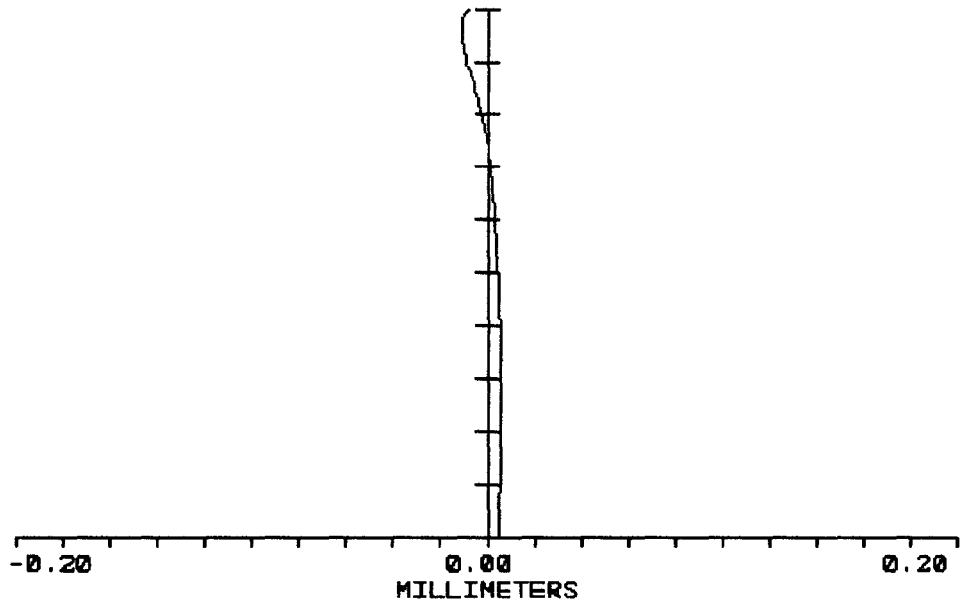
FIG. 9 is a chart of the spherical aberration of the imaging lens module shown in FIG. 6.

Referring to FIG. 2, there is shown the non-dotted aberration of the imaging lens module. Referring to FIG. 3, there is shown the distortion aberration of the imaging lens module. Referring to FIG. 4, there is shown the spherical aberration of the imaging lens module. Referring to FIG. 5, there are shown the optical characteristics and aspheric coefficients of the imaging lens module. All of the aberrations are related to the data of the d-line. The non-dotted aberration is related to the sagital data and the tangential data. From the aberrations, it is known that the compensations for the aberrations are obtained from complete simulations and without any problem in practice.

Referring to FIGS. 6 to 10, there is shown an imaging lens module according to a second embodiment of the present invention. The second embodiment is like the first embodiment except that the lenses L1, L2, L3 and L4 are made with different aperture stops.

The term "F. No." is a luminance parameter. The luminance gets lower as the F. No. gets larger.

The term "2ω" represents the angle of view.

The term "f" represents the focal length (mm). The numbers "1, 2, 4, 5, 6, 7, 8, 9, 10, 11, 12 and 13" represent the surfaces of the lens and the flat glass panels from the object A to the image B. The numbers "1 and 2" represent two surfaces of the first lens L1. The numbers "4 and 5" represent two surfaces of the second lens L2. The numbers "6 and 7" represent two surfaces of the third lens L3. The numbers "8 and 9" represent two surfaces of the fourth lens L4. The numbers "10 and 11" represent two surfaces of the first flat glass panel 2. The numbers "12 and 13" represent the surfaces of the second flat glass panel 3.

To overcome the problems with the conventional four-piece imaging lens module, the first lens L1 includes a concave surface disposed towards the image B. The fourth lens L4 includes a concave surface disposed towards the object A. The focal length of the first lens L1 with the whole lens module is under control, and so is the focal length of the second lens L2 with the third lens L3. The focal length of the combination of the second lens L2, the third lens L3 and the fourth lens L4 with the whole lens module is under control. To achieve the ultimate quality, the following rules must be followed:

The first lens L1 includes a concave surface disposed towards the image B. The focal length of the first lens L1 relative to that of the whole lens module is controlled as follows:

$$0.4 < |f1|/|f| < 0.9$$

wherein |f1| is the absolute value of the focal length of the first lens L1, and |f| is the absolute value of the focal length of the whole lens module (L1, L2, L3, L4).

The focal length of the second lens L2 relative to that of the third lens L3 is controlled as follows:

$$1.5 < |f2|/|f3| < 2.5$$

wherein |f2| is the absolute value of the focal length of the second lens L2, and |f3| is the absolute value of the focal length of the third lens L3.

The focal lengths of the lenses L1, L2, L3 and L4 are controlled as follows:

$$|f234|/|f| < 3$$

wherein |f234| is the absolute value of the focal length of the combination of the second, third and fourth lenses (L2, L3, L4), and |f| is the absolute value of the focal length of the whole lens module (L1, L2, L3, L4).

To achieve high image quality, the refractive indexes of the lens are under control as follows:

$$N2 > 1.57;\text{ and}$$

$$V2 < 40$$

wherein the term "N2" represents the refractive index of the second lens L2 while the term "V2" represents the Abbe number of the second lens L2.

If fulfilling the foregoing equations, the imaging lens module will provide a large number of pixels and high resolution. If not, the imaging lens module will provide an inadequate number of pixels and low resolution, and the yield thereof will be low.

Moreover, both of the surfaces of each of the lenses can be aspheric and regulated with the following equation:

$$Z = ch^2/\{1+[1-(k+1)c^2h^2]^{0.5}\} + Ah^4 + Bh^6 + Ch^8 + Dh^{10} + Eh^{12} + Gh^{14} + \ldots$$

wherein the term "Z" represents the value of a reference position with respect to a vertex of the surface of a lens and a position with a height h along the optical axis, the term "k" represents the conic constant, the term "c" represents the reciprocal of the curvature radius, and the terms "A, B, C, D, E, G, ..." represent the high-order aspheric coefficients.

There are advantageous features of the imaging lens module according to the present invention worth notice. The second surface of the first lens L1 is concave near the optical axis while both of the first surfaces of the fourth lens L4 are concave near the optical axis. Thus, the optical length TL of the imaging lens module is reduced so that the imaging lens module is light and small and suitable for use in a limited space. Moreover, it satisfies the need for high resolution in a digital carrier and, more particularly, it provides three million pixels or more without compromising the image quality and color saturation.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. An imaging lens module, comprising a fixed aperture stop and an optical module, and the optical module comprising first, second, third and fourth lenses arranged from an object to an image in a sequence of:

the first lens, having a meniscus lens with positive refractive power and a concave surface disposed towards the image, and at least one surface thereof being an aspheric surface;

the fixed aperture stop;

the second lens, having a meniscus lens with negative refractive power and a concave surface disposed towards the image, and at least one surface thereof being an aspheric surface;

the third lens, having a meniscus lens with positive refractive power and a convex surface disposed towards the image, and at least one surface thereof being an aspheric surface; and the fourth lens, having a concave surface disposed towards the object, and at least one surface thereof being an aspheric surface.

2. The imaging lens module according to claim 1, wherein:

$0.4<|f1|/|f|<0.9;$ wherein |f1| is the absolute value of the focal length of the first lens, and |f| is the absolute value of the focal length of the whole lens module.

3. The imaging lens module according to claim 1, wherein:

$1.5<|f2|/|f3|<2.5;$ wherein |f2| is the absolute value of the focal length of the second lens, and |f3| is the absolute value of the focal length of the third lens.

4. The imaging lens module according to claim 1, wherein:

$|f234|/|f|<3;$ wherein |f234| is the absolute value of the focal length of the combination of the second, third and fourth lenses, and |f| is the absolute value of the focal length of the whole lens module.

5. The imaging lens module according to claim 1, wherein:

$N2>1.57;$ and $V2<40;$ wherein N2 is the refractive index of the second lens, and V2 is the Abbe number of the second lens.

6. The imaging lens module according to claim 1, wherein the aspheric surfaces are ruled by an equation as follows:

$$Z=ch^2/\{1+[1-(k+1)c^2h^2]^{0.5}\}+Ah^4+Bh^6+Ch^8+Dh^{10}+Eh^{12}+Gh^{14}+\ldots$$

wherein the term "Z" represents the value of a reference position with respect to a vertex of the surface of a lens and a position with a height h along the optical axis; "k" represents a conic constant, "c" represents the reciprocal of a curvature radius, and "A, B, C, D, E, G, . . . " represent the high-order aspheric coefficients.

* * * * *